United States Patent
Clemens

(10) Patent No.: US 8,471,904 B2
(45) Date of Patent: Jun. 25, 2013

(54) HIDDEN SECURITY TECHNIQUES FOR WIRELESS SECURITY DEVICES

(75) Inventor: Jonathan P. Clemens, DuPont, WA (US)

(73) Assignee: Intel Corporation, Santa Clara, CA (US)

(*) Notice: Subject to any disclaimer, the term of this patent is extended or adjusted under 35 U.S.C. 154(b) by 1438 days.

(21) Appl. No.: 11/524,154

(22) Filed: Sep. 19, 2006

(65) Prior Publication Data

US 2008/0068457 A1    Mar. 20, 2008

(51) Int. Cl.
| | |
|---|---|
| H04N 7/18 | (2006.01) |
| H04N 7/16 | (2011.01) |
| H04N 5/33 | (2006.01) |
| H04N 5/225 | (2006.01) |
| H04N 7/173 | (2011.01) |
| G06F 17/00 | (2006.01) |
| G06K 9/00 | (2006.01) |

(52) U.S. Cl.
USPC ........... 348/143; 348/164; 348/169; 707/697; 725/117; 725/118

(58) Field of Classification Search
USPC ........... 348/143, 164; 707/687, 697; 725/117, 725/118, 30, 147.148, 150; 340/307
See application file for complete search history.

(56) References Cited

U.S. PATENT DOCUMENTS

| | | | |
|---|---|---|---|
| 6,970,183 B1 * | 11/2005 | Monroe | 348/143 |
| RE42,973 E * | 11/2011 | Steinberg et al. | 348/211.3 |
| 2002/0048368 A1 * | 4/2002 | Gardner | 380/277 |
| 2005/0005093 A1 * | 1/2005 | Bartels et al. | 713/150 |
| 2005/0018766 A1 * | 1/2005 | Iwamura | 375/240.01 |
| 2005/0091338 A1 * | 4/2005 | de la Huerga | 709/217 |
| 2005/0114749 A1 * | 5/2005 | Yonge et al. | 714/752 |
| 2005/0120124 A1 * | 6/2005 | Korhonen | 709/231 |
| 2006/0031901 A1 * | 2/2006 | Creamer et al. | 725/105 |
| 2006/0256792 A1 * | 11/2006 | Kwong et al. | 370/394 |
| 2007/0300074 A1 * | 12/2007 | Natter | 713/182 |

FOREIGN PATENT DOCUMENTS

GB    2178627 A  *  2/1987

* cited by examiner

*Primary Examiner* — Joseph Ustaris
*Assistant Examiner* — On S Mung
(74) *Attorney, Agent, or Firm* — Schwegman, Lundberg & Woessner, P.A.

(57) ABSTRACT

A security device transmits captured information wirelessly while transmitting checksums for the information via a power line. The security device may be a security camera, a badge reader, or the like.

29 Claims, 3 Drawing Sheets

HIDDEN SECURITY TECHNIQUES FOR WIRELESS SECURITY DEVICES

BACKGROUND

Description of the Related Art

The use of wireless technology is increasing. Wireless devices are typically easy and cost effective to install, often requiring a power source but not a connection to network cables. Wireless technology throughput is increasing, further expanding the adoption of wireless devices in various applications.

One down side of wireless technology is that it is vulnerable to attack, for example through the use of frequency jamming, unauthorized use of the wireless medium, or other such denial of service attacks. In addition to the potential of denial of service attacks, security devices are also vulnerable to physical attacks. When combined with a physical attack against a wireless device, for example, a security camera, a replay attack can be very effective. That is, a criminal attacker may capture wireless data, disable the security camera, and re-broadcast altered previous footage as a decoy. Thus, wireless technology may not be widely adopted in security applications such as wireless security cameras.

Techniques to improve the vulnerability of wireless technology against denial of service and/or physical attacks may aid in widespread adoption of wireless technology in security applications.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DESCRIPTION OF THE EMBODIMENT(S)

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Figure 1:
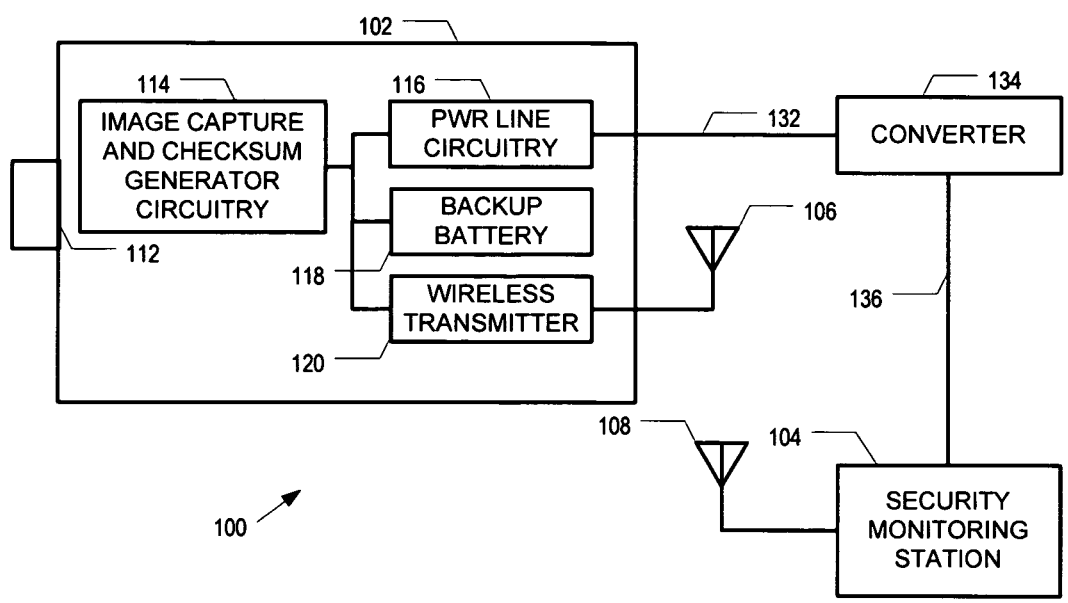
FIG. 1 illustrates a security device utilizing a hidden security technique according to an embodiment of the present invention.

FIG. 1 illustrates a security device utilizing a hidden security technique according to an embodiment of the present invention. Security system 100 typically includes at least one security camera 102 that communicates with a security monitoring station 104. Security camera 102 includes an antenna 106 to communicate wirelessly to antenna 108 attached to security monitoring station 104.

Security camera 104 may include a lens 112, image capture and checksum generator circuitry 114, power line circuitry 116, a backup battery 118 and wireless transmitter 120. Utilizing lens 112, image capture and checksum generator circuitry 114 captures an image to be transmitted via wireless transmitter 120 and antenna 106 to security monitoring station 104. The captured image may be complete or portions of a still image, one or more video images, or the like and may or may not include audio information. In addition, image capture and checksum generator circuitry 114 generates a checksum for the information sent wirelessly to security monitoring station 104. The checksum information is sent on power line 132 using power line circuitry 116 to a converter 134. Power line circuitry 116 is a data-over power transmitter. Converter 134 extracts the checksum from power line 132 and converts the information to a format usable by security monitoring station 104. The converted checksum is sent to security monitoring station 104 via path 136. Path 136 may be, for example, internal wiring of security monitoring station 104, a wired local area network, or any communication path that can securely send the checksum to security monitoring station 104. Security monitoring station 104 may be a centralized (possibly remote) human or computer managed system, responsible for processing input from security devices and responding to alarms based on the detections of or attacks against the security devices.

During normal operation, the security device sends data to the security device controller via wireless communications, and the security device controller passes the data on to the security console for action. The data-over-power communication, being much lower bandwidth, is used to send periodic checksums from the security device to the security device controller, assuring the controller that the security device is functioning properly as long as the checksums received over the data-over-power interface match the data received through the wireless interface.

If the wireless signal is jammed, the security device controller may receive checksums but no associated data, indicating the failure of the wireless link, but the continued operation of the security device.

If the power cord to the security device is cut, the security device may send a 'power fail' message via wireless transmitter 120 and antenna 106 using power from backup battery 118. If the building power has not failed at security monitoring station 104 or at other managed security devices, the power loss may be interpreted as an attack against a particular device.

If an attacker attempts to jam the wireless signal and provide substitute data, the checksums will not match and security monitoring station 104 may detect the invalid data. Note that even if an attacker is able to break any wireless encryption used between security camera 102 and security monitoring station 104, an attacker may not be able to determine the checksum algorithm used, nor have any means to inject fake checksums into the data-over-power channel.

By sending a checksum over power line 132, enhanced security can be provided for wireless security devices that are vulnerable to physical attack and/or wireless denial of service. By providing a hidden data/diagnostic path, security devices become much more resilient to attack, and fail in ways that alert the system of an attack in progress. Because the wireless output is obvious, criminals desiring to disable the security device would not normally detect the presence of the device's secondary communication mechanism.

The wireless medium utilized by the security system may be configured in accordance with one or more wireless networking standards. For example, in one embodiment, wireless transmitter 120 may be configured to transmit according to an IEEE 802.11a wireless network, an IEEE 802.11b, g wireless network, an IEEE 802.16 wireless network, and so on. Other wireless networking standards that may be represented in various embodiments include, for example, IEEE 802.15, HomeRF, Ultrawideband, HiperLAN 1, 2, and/or others.

Although the embodiments herein are described with respect to security cameras, any security device may use similar hidden fail safe techniques. For example, a badge reader may read a badge and transmit a read image wirelessly while a checksum is sent to a security station via an associated power line. Other security devices may include biometric readers such as retina scanners, fingerprint scanners and the like and continuous observation devices such as infrared cameras, motion sensors and the like.

Figure 2:
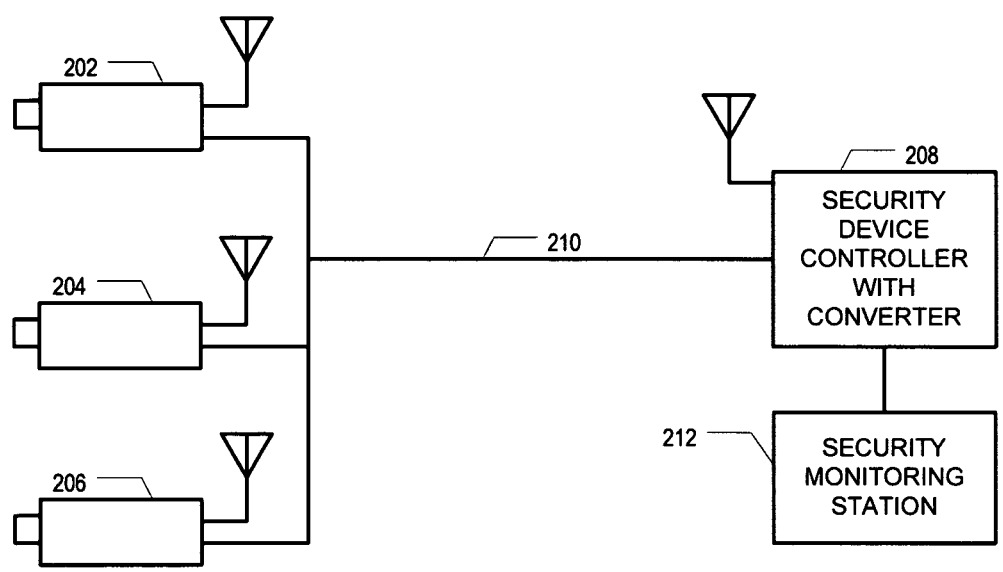
FIG. 2 illustrates a system having multiple security devices utilizing hidden security techniques according to an embodiment of the present invention.

FIG. 2 illustrates a system having multiple security devices utilizing hidden security techniques according to an embodiment of the present invention. Security system 200 includes multiple security cameras 202-206 that communicate captured images wirelessly to security device controller 208. Security cameras 202-206 each send a check sum for a captured image via a share power line 210 to security device controller 208. Security Device Controller 208 retransmits received images and checksums to security monitoring station 212. Preferably, security device controller 208 is located within wireless range of security devices 202-206, but is physically secure against attack, and has a protected power source and secure data communications channel to security monitoring station 212.

Security cameras 202-206 may use time-division multiplexing techniques or frequency modulation techniques to share the power line. Alternatively, each of security cameras 202-206 may have a dedicated power line 210 and/or a dedicated security device controller 208.

Figure 3:
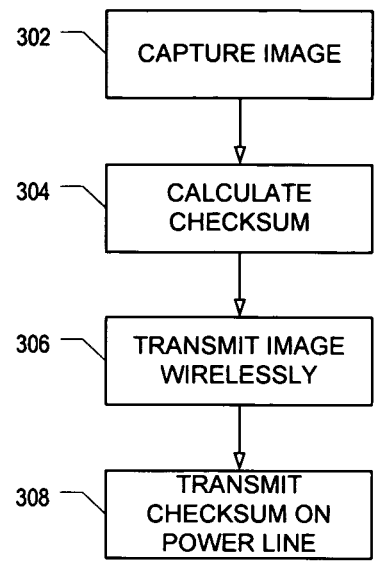
FIG. 3 illustrates a flow diagram of a security device utilizing a hidden security technique according to an embodiment of the present invention.

FIG. 3 illustrates a flow diagram of a security device utilizing a hidden fail safe technique according to an embodiment of the present invention. An image is captured, block 302. A checksum is calculated on the captured image, block 304. The image is transmitted wireless, block 306. Finally, the checksum is transmitted on a power line, block 306.

Figure 4:
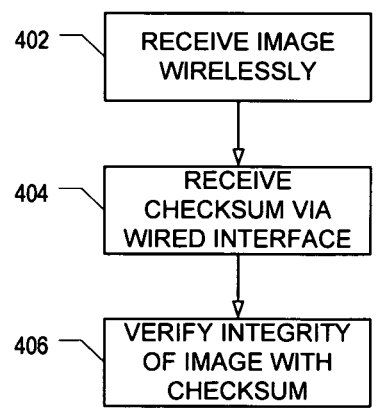
FIG. 4 illustrates a flow diagram of a security system according to an embodiment of the present invention.

FIG. 4 illustrates a flow diagram of a security system according to an embodiment of the present invention. An image is received wirelessly, block 402. A checksum is received via a wired interface, block 404. Finally, a integrity of the image is verified using the checksum, block 406.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A security apparatus with a hidden security technique, the security apparatus comprising:
   capture circuitry to capture an image and generate a checksum from the image;
   a wireless interface coupled to the capture circuitry, the wireless interface configured to: transmit the image to a monitoring station over a wireless network; and
   a power interface coupled to the capture circuitry, the power interface configured to: supply power to the capture circuitry and transmit the checksum to the monitoring station over a power line network;
   wherein, to determine that a replay attack is ongoing, the monitoring station detects a mismatch between a checksum calculated from the image received over the wireless network and the checksum received over the power line network; and
   wherein, to determine that a wireless jamming attack is ongoing, the monitoring station detects receipt of the checksum over the power line network in addition to failure to receive the image over the wireless network.

2. The apparatus as recited in claim 1, wherein the image is a frame of a video stream.

3. The apparatus as recited in claim 1, wherein the image is a portion of a frame of a video stream.

4. The apparatus as recited in claim 1, wherein the image is information sensed by an electronic scanner.

5. The apparatus as recited in claim 1, wherein the capture circuitry is one of a: badge scanner, biometric reader, or continuous observation device.

6. The apparatus as recited in claim 1, further comprising a backup battery and circuitry powered by the battery to send a wireless transmission if the power supplied by the power interface is interrupted.

7. A method comprising:
   capturing an image using capture circuitry;
   calculating a checksum of the image;
   transmitting the image to a monitoring station over a wireless network; and
   transmitting the checksum via a power line, over a power line network to the monitoring station, the checksum for comparison at a receiver with a second checksum calculated from the wirelessly received image;
   wherein, to determine that a replay attack is ongoing, the monitoring station detects a mismatch between a checksum calculated from the image received over the wireless network and the checksum received over the power line network; and
   wherein, to determine that a wireless jamming attack is ongoing, the monitoring station detects receipt of the checksum over the power line network in addition to failure to receive the image over the wireless network.

8. The method as recited in claim 7, wherein the image is a frame of a video stream.

9. The method as recited in claim 7, wherein the image is a portion of a frame of a video stream.

10. The method as recited in claim 7, wherein the image is information sensed by an electronic scanner.

11. The method as recited in claim 7, wherein the capture circuitry is one of a: badge scanner, biometric reader, or continuous observation device.

12. The method as recited in claim 7, further comprising: if the power supplied by the power interface is interrupted, sending a wireless transmission using a backup battery and circuitry powered by the battery.

13. A system comprising:
   a wired receiver configured to receive a checksum that was transmitted on a power line over a power line network from a security device;
   a wireless receiver configured to receive an image from the security device wirelessly over a wireless network; and
   circuitry configured to:
      determine that a replay attack is ongoing based upon a mismatch between a checksum calculated from the image received over the wireless network and the checksum received over the power line network; and
      determine that a wireless jamming attack is ongoing based upon receipt of the checksum over the power line network in addition to failure to receive the image over the wireless network.

14. The system as recited in claim 13, wherein the image is a frame of a video stream.

15. The system as recited in claim 13, wherein the image is a portion of a frame of a video stream.

16. The system as recited in claim 13, wherein the image is information sensed by an electronic scanner.

17. A system comprising:
   capture circuitry arranged to capture an image and generate a checksum for the image;
   an antenna;
   a wireless interface coupled to the capture circuitry, the wireless interface arranged to transmit the image on the antenna over a wireless network to a monitoring station; and
   a power interface coupled to the capture circuitry, the power interface arranged to supply power to the capture circuitry and to transmit the checksum on a power line over a power line network, the checksum provided for comparison at a receiver with a second checksum calculated from the wirelessly received image;
   wherein, to determine that a replay attack is ongoing, the monitoring station detects a mismatch between a checksum calculated from the image transmitted over the wireless network and the checksum transmitted over the power line network; and
   wherein, to determine that a wireless jamming attack is ongoing, the monitoring station receives the checksum over the power line network in addition to failing to receive the image over the wireless network.

18. The system as recited in claim 17, wherein the image is a frame of a video stream.

19. The system as recited in claim 17, wherein the image is a portion of a frame of a video stream.

20. The system as recited in claim 17, wherein the image is information sensed by an electronic scanner.

21. The system as recited in claim 17, wherein the capture circuitry is a badge scanner.

22. The system as recited in claim 17, wherein the capture circuitry is a biometric reader.

23. The system as recited in claim 17, wherein the capture circuitry is a continuous observation device.

24. The system as recited in claim 17, further comprising a backup battery and circuitry powered by the battery to send a wireless transmission if the power supplied by the power interface is interrupted.

25. The system as recited in claim 17, further comprising a monitoring station configured to wirelessly receive the capture image and receive the checksum over the power line, and further configured to generate a second checksum from the wirelessly received capture image and compare the second checksum to the received checksum.

26. The apparatus as recited in claim 1, the wireless interface further configured to transmit a power fail message to the monitoring station over the wireless network in response to a power failure event, wherein, to determine that a physical attack of the security apparatus is ongoing, the monitoring station detects receipt of the power fail message from the security apparatus over the wireless network in addition to determining that building power has not failed in a building where the security apparatus is located.

27. The method as recited in claim 7, wherein, to determine that a physical attack is ongoing, the monitoring station detects a power fail message received over the wireless network in addition to determining that building power has not failed in a location where the image was captured.

28. The system as recited in claim 13, wherein the circuitry is further configured to determine that a physical attack of the security device is ongoing based upon receipt of a power fail message from the security device over the wireless network in addition to determining that building power has not failed in a building where the security device is located.

29. The system as recited in claim 17, wherein, to determine that a physical attack is ongoing, the monitoring station detects power failure of the power line in addition to detecting that building power has not failed in a location of the capture circuitry.

* * * * *